April 14, 1936.    F. A. HOLBY    2,037,021
TANK TRUCK
Original Filed April 3, 1933    3 Sheets-Sheet 2
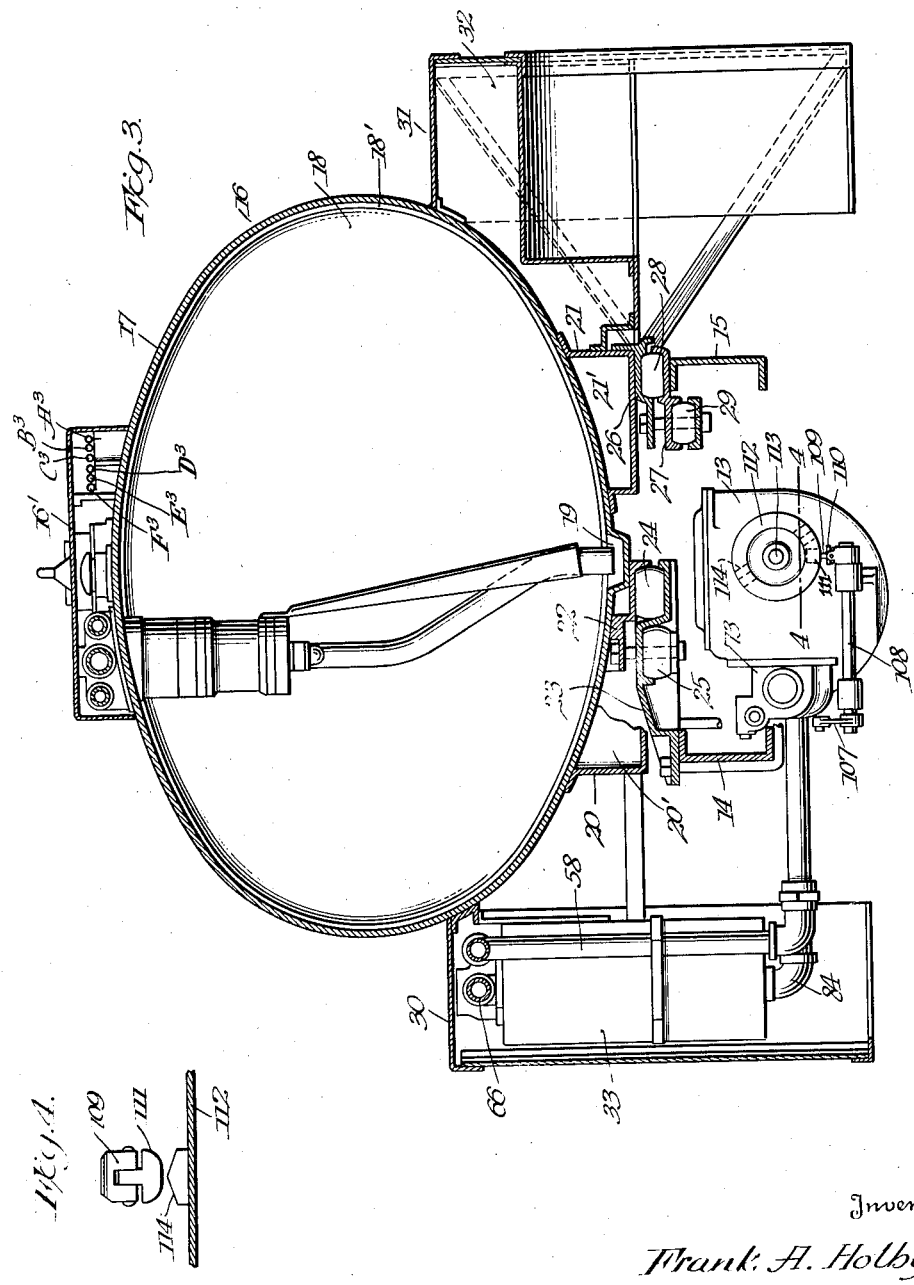
Inventor,
Frank A. Holby.
By Cushman, Darby & Cushman
Attorneys

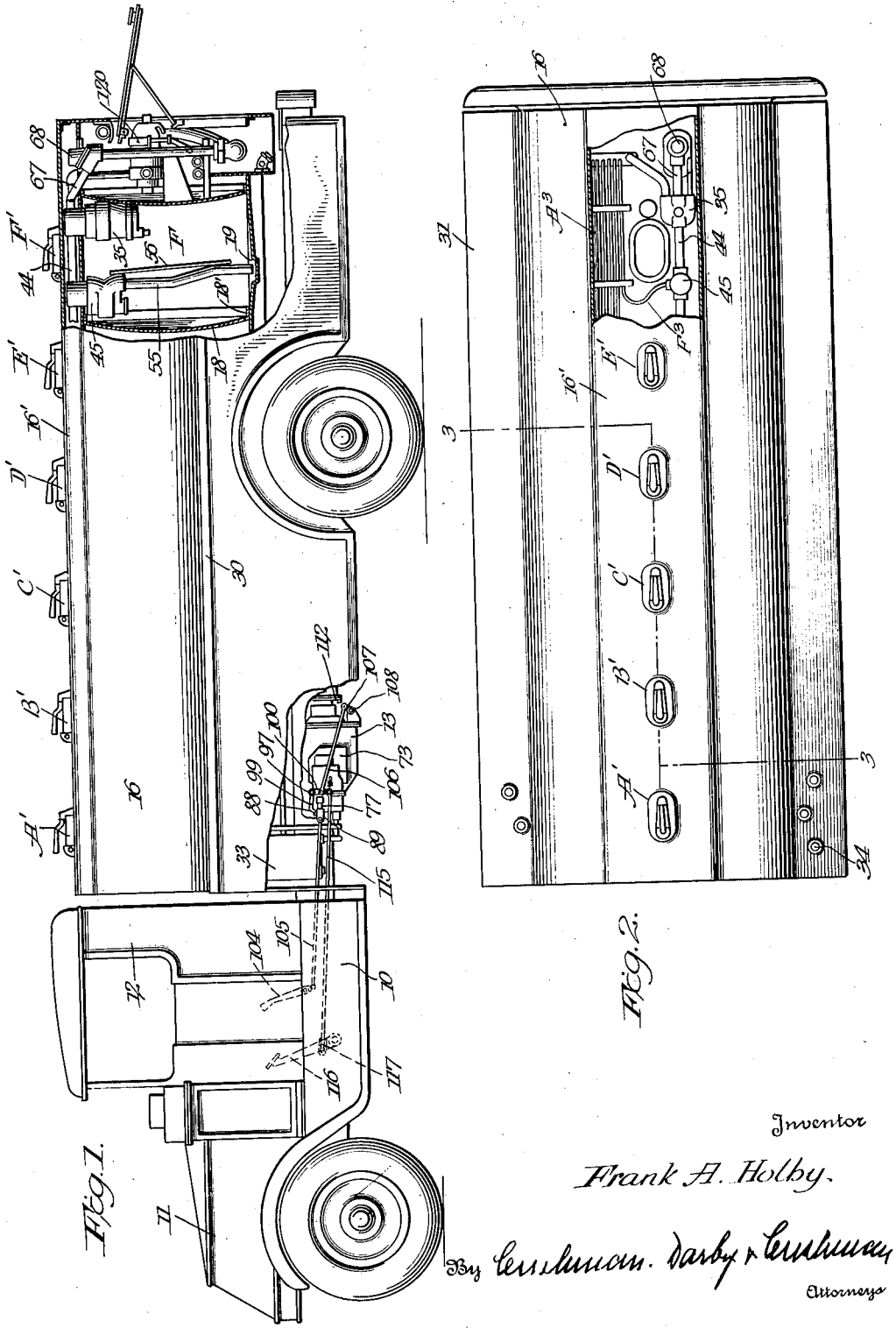

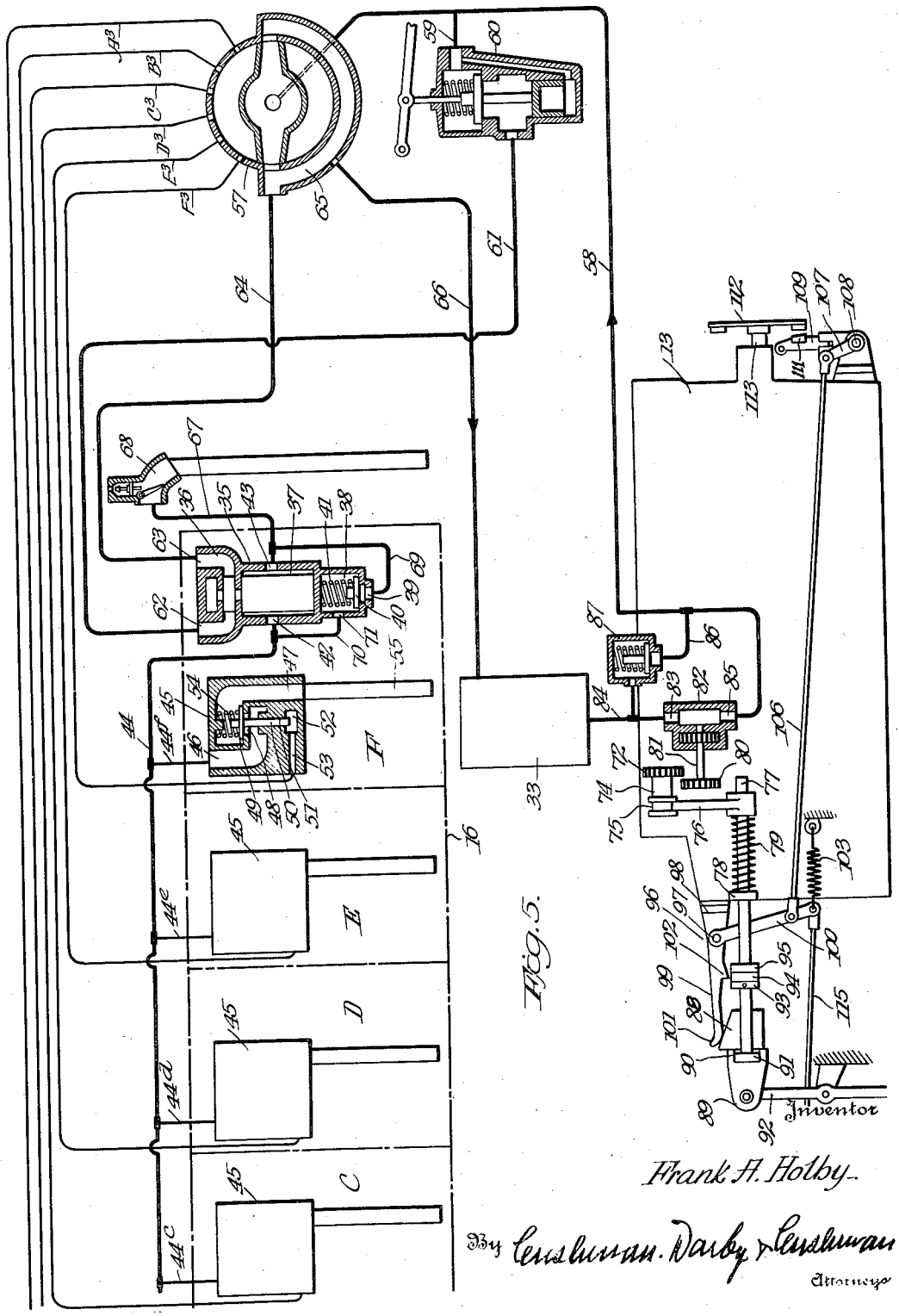

Patented Apr. 14, 1936

2,037,021

UNITED STATES PATENT OFFICE 2,037,021

TANK TRUCK

Frank A. Holby, New York, N. Y., assignor, by mesne assignments, to The William F. Kenny Co., New York, N. Y., a corporation of New York Original application April 3, 1933, Serial No. 664,255. Divided and this application August 5, 1933, Serial No. 683,887. Renewed July 6, 1935

22 Claims. (Cl. 180—82)

The present invention relates particularly to safety provisions for tank trucks whereby upon the arising of certain conditions, tank discharge is instantaneously and automatically interrupted. For instance, if the truck undergoes accidental travelling movement, if the clutch is moved as for the purpose of putting the transmission in gear, or if the transmission is placed in gear without operation of the clutch, mechanism is automatically operated to interrupt discharge. Also, means are provided for automatically cutting off discharge upon an increase in temperature such as would be caused by a fire in the vicinity of the control apparatus.

In the preferred embodiment of the invention shown in the accompanying drawings, and with reference to which the invention will be described, a positive pump discharge is shown, the discharge pump being driven by a hydraulic motor which in turn is driven through a master pump, the safety mechanism operating to interrupt a driving connection between the main truck motor and the master pump. It is desired to point out here, however, that the invention is not limited in application to such an arrangement, nor is it necessarily limited to other details of construction which will be described.

In the drawings:

Figure 1 is a side elevation with parts broken away to reveal others of a tank truck constructed in accordance with the present invention, Figure 2 is a plan view of the tank with parts broken away, Figure 3 is a section substantially on the line 3—3 of Figure 2, Figure 4 is a section substantially on the line 4—4 of Figure 3, and Figure 5 is a diagram illustrating the tank discharge system and showing in elevation, with parts in section, the main elements of the safety control.

Referring to the drawings, reference numeral 10 designates generally a wheeled chassis including an engine compartment 11, a cab 12, transmission mechanism 13 and longitudinal frame members in the form of channel members 14 and 15, Figure 3, these channel members being preferably sprung on the wheel axles. This construction is all of usual design and need not be specifically described for the purposes of the present application. Transmission 13 has the usual power take-off provisions which in the embodiment of the invention to be described are utilized for the drive of a master pump.

A main tank 16 extends above the channel members 14 and 15 longitudinally thereof for support thereby. The tank is preferably made from a single wrapping sheet 17 and is divided into a number of tank compartments by means of dished bulkheads 18 whose peripheral flanges 18' are continuously welded to the inside of the wrapper sheet and contribute considerably to the rigidity of the main tank. Each compartment has a small well 19 in its bottom wall, Figures 1 and 3. The main tank is divided into any desired number of compartments by the bulkheads. In the present description it is assumed that there are six compartments A, B, C, D, E and F, of which four appear in Figure 5 and are designated by the reference characters C, D, E and F. Each tank compartment has its own filling opening at the top of the tank and the covers for these filling openings are designated by the reference characters $A^1$, $B^1$, $C^1$, $D^1$, $E^1$, and $F^1$, Figure 1.

Referring particularly to Figure 3, two U-shaped channel members 20 and 21 are welded to the bottom of the tank and extend substantially throughout the length of the latter, the ends of these channel chambers being closed by end walls as at 20' and 21', thus enabling them to be utilized as auxiliary tanks for the transportation of oil or other fluids. These auxiliary tanks overlie the longitudinal chassis members 14 and 15.

Adjacent the front end of the tank the latter has secured thereto on its underside a saddle member 22 which overlies a bolster 23 secured across the tops of chassis members 14 and 15. Interposed between the saddle member and bolster are a number of compressible blocks 24 of rubber or the like, there being also provided rebound blocks as at 25 beneath the bolster. At the rear end of the tank and substantially above the rear axle, brackets, as at 26, are secured to the bottoms of auxiliary tanks 20 and 21 in overlying relation to brackets as at 27, secured on top of members 14 and 15. Compressible blocks, as at 28, are interposed between brackets 26 and 27 and rebound blocks as at 29 are provided. This substantially three-point cushion mounting has been more specifically described in my application Serial No. 664,255, filed April 3, 1933, of which the present application is a division, this subject matter being also shown and claimed in my copending application Serial No. 719,568, filed April 7, 1934, as a division of Serial No. 664,255.

Strips 30 and 31 are secured along the sides of the main tank 16 in horizontally projecting relation and in addition to serving as walkways, serve as the top walls of auxiliary tanks of which one is designated at 32 at the right of Figure 3.

The section of the left of Figure 3 is taken in advance of a similar tank 32 at the left of the truck, the section plane being immediately to the rear of a reservoir 33 for the pressure fluid. A filling opening for this reservoir is indicated at 34, Figure 2.

In the rearmost tank F is disposed a combined motor and discharge pump unit generally indicated by reference numeral 35, the motor chamber being designated at 36 and the pump chamber at 37. Below the pump compartment and preferably in the same casing with the motor and pump is a chamber 38 having a bottom opening 39 closed by a valve disc 40 which is seated on an annular ledge at the bottom of chamber 38 by means of a compression spring 41. The pump casing has an intake opening 42 and a discharge opening 43. A manifold 44 which extends above all of the tank compartments is connected into the inlet opening 42 and has branches 44$^c$, 44$^d$, 44$^e$ and 44$^f$ connected to the outlet openings of valve housings 45 of which one is disposed in each tank compartment. The valve housing 45 in tank F is shown in cross section and will be briefly described, it being understood that the remaining valve housings 45 and appurtenant parts are identical.

The outlet opening of the valve housing 45 in compartment F with which branch 44$^f$ is in connection, is designated by the reference numeral 46. The housing provides an inlet passage 47 which has a horizontal portion above a horizontal portion of passage 46, the two passages being connected through an aperture 48. A valve disc 49 seats on the upper margins of aperture 48 and has a stem 50 fixed thereto and guided in a bore 51 in the housing, the lower end of the stem projecting into a chamber 52 in the housing. A passage 53 communicates chamber 52 with the housing exterior. Valve 49 is normally held in seated position by means of a compression spring 54 interposed between it and the valve housing wall thereabove. However, the valve is adapted to be unseated in response to pressure introduced into chamber 52 and acting on the lower end of stem 50. A suction pipe 55 extends downwardly from inlet passage 47 with its lower end adjacent the bottom of the tank and above well 19, Figure 1, the suction pipe being steadied by a brace 56 welded at its upper end to the housing 45 and at its lower end to the pipe.

In order that discharge may be effected from a selected compartment, means are provided for directing fluid under pressure into the chamber 52 of a housing 45 and for controlling the supply of pressure fluid to motor casing 36 so that the discharge pump will be driven to withdraw from the selected tank compartment. A selector valve 57 includes means for directing pressure fluid into any one of lines A$^3$ to F$^3$ which are respectively in connection with passages 53 of the valve housings 45 in tank compartments A to F. Pressure fluid is supplied to the distributor valve through a supply conduit 58 and a branch 59 connects conduit 58 with a control valve 60 operable to admit pressure fluid to conduit 61 which leads to the inlet opening 62 of the pump motor. The outlet opening 63 of the pump motor is connected by means of conduit 64 with an exhaust chamber 65 in the selector valve housing, this exhaust chamber being connected through an exhaust conduit 66 with reservoir 33. Upon operation of the discharge pump fluid is drawn from the selected tank compartment through the manifold and discharged through the conduit 67 which preferably has interposed therein a siphon breaker 68. A branch 69 extends between conduit 67, adjacent outlet opening 43, and aperture 39 at the bottom of chamber 38. Upon occurrence of back pressure in conduit 67 under certain conditions, valve 40 will be unseated and the pump output by-passed through branch 69 and a branch 70 which extends between an aperture 71 in a wall of chamber 38 and manifold 44 adjacent the pump inlet 42. As indicated in Figures 1 and 2, lines A$^3$ to F$^3$ and manifold 44 are preferably disposed on top of the main tank and protected by a shroud 16'.

It is believed that the above brief description of the tank discharge control mechanism will suffice for the purposes of the present application, inasmuch as this system is not claimed herein but in the parent application mentioned above. The particular mechanism in which the present invention resides will now be described.

The take-off gear (not shown) of the transmission 13 is constantly in mesh with a gear 72 slidably journaled in a casing 73 secured to the transmission housing. Gear 72 has an elongated hub 74 provided with an annular recess 75 engaged by a shipper member 76, the shipper member being fixed on a longitudinally slidable rod 77. Interposed between the shipper member and a fixed abutment 78 and surrounding rod 77 is a compression spring 79 which acts on rod 77 and the shipper member 76 to yieldably hold gear 72 in the position shown in Figure 5 wherein it is out of mesh with a pump driving gear 80. Gear 80 is fixed on the drive shaft 81 of a master pump 82 whose inlet opening 83 is in connection with reservoir 33 through a conduit 84 and into whose discharge opening 85 conduit 58 is connected. A by-pass line 86 between conduits 58 and 84 has a pressure relief valve 87 interposed therein. When pump 82 is driven and valve 60 is opened so that pressure fluid is supplied to motor casing 36, the discharge pump is driven and fluid is withdrawn from a previously selected tank compartment. It is evident that if drive of master pump 82 is interrupted the operation of the discharge pump is concomitantly interrupted. Gears 72 and 80 constitute a disengageable driving connection or power coupling whose disengagement is effected by spring 79 upon the occurrence of the conditions mentioned at the outset or whenever it is desired to interrupt discharge. The movable element of the connection gear 72 is controlled as follows:

The end of rod 77 opposite the shipper member is slidable in a bore provided in a cam block 88 which presents a top cam surface inclined downwardly toward the shipper member. A clevis 89 secured to the outer end of the cam block has a recess 90 which receives the headed end 91 of rod 77 with possibility of limited axial movement. Pivoted to the clevis is an actuating lever 92.

Intermediate fixed abutment 78 and cam block 88 an abutment 93 is fixed on rod 77 and a washer 94 of easily fusible material is interposed between abutment 93 and a washer 95 which latter provides a wearing surface for a purpose to be explained. The fusible washer 94 is bonded as by slight fusion to both abutment 93 and washer 95 so that the three elements form in effect a unitary abutment. A bell crank lever 96 is pivoted at 97 on a bracket 98, this lever having a horizontally extending arm 99 above rod 77 and a downwardly extending arm 100. Arm 99 has at its free extremity a nose 101 which rides on the cam surface of block 88. Intermediate this nose and pivot 97 arm 99 has formed thereon a dog 102. A tension spring 103 secured to the lower end of arm 100 acts to hold nose 101 on the cam surface.

To engage the connection 72, 80, lever 92 is actuated to draw rod 77 to the left against the action of spring 79. As rod 77 moves to the left, being drawn by cam block 88, nose 101 rides down on the cam surface and permits dog 102 to engage behind washer 95. When dog 102 thus engages washer 95 gear 72 is in engagement with gear 80 and still, of course, with the power take-off gear so that pump 82 is driven, arm 99 serving as a latch member to maintain the driving connection. Under ordinary circumstances, when it is desired to break the driving connection, lever 92 is manipulated to move cam block 88 to the right. Due to the lost motion connection the cam block first moves relative to rod 77, thereby camming nose 101 upwardly and eventually lifting dog 102 out of engagement with washer 95. Spring 79 is now free to act and move rod 77 and shipper 76 to the right, thereby disengaging gear 72 from gear 80.

Preferably the operating lever for rod 77 is placed in the truck cab, and in Figure 1 is shown as being so positioned. In Figure 1 the lever is designated by the reference numeral 104 and its connecting rod by the reference numeral 105. Such parts as master pump 82 are preferably contained in the housing 73 with gears 72 and 80. As has been mentioned, the reservoir 33 is preferably supported under the forward end of runway 30, as shown in Figure 3, the reservoir connections having the same reference numerals in Figure 3 as in the diagram of Figure 5.

Pivoted to the lower end of bell crank lever arm 100 is a rod 106 which at its opposite end is pivoted to an arm 107 mounted on a rock shaft 108. Referring to Figures 3 and 5, rock shaft 108 has fixed on its other end an articulated arm 109, the arm being articulated on an axis 110 which is perpendicular to an axial plane of shaft 108. The upper end of arm 109, above the pivot 110, carries a button 111 which projects behind the front companion flange 112 of the front universal joint of the truck drive, this flange or disc being fixed on the transmission tail shaft 113. The front face of flange 112 is provided with a plurality of triangularly shaped cams 114, see also Figure 4, whose path of rotation is such as to enable them to engage button 111 when bell crank lever arm 100 is drawn to the right by spring 103 as dog 102 takes behind washer 95 upon manipulation of lever 92 to engage elements 72 and 80.

When rod 106 thus moves to the right to position button 111 closely adjacent the face of flange 112, it may be that a cam 114 is directly in register with a button 111. Under these circumstances, the upper end of arm 109 swings about joint 110 and permits the button to ride down one or the other of the faces of the cam in question. It will be noted from Figure 3 that the upper and lower portions of arm 109 present opposed shoulders adjacent pivot 110 and relatively weak springs interposed between these shoulders maintain the upper arm portion in its normal vertical position. Flange 112 is, of course, stationary in view of the neutral position of the truck transmission gearing but upon its rotation through any cause, a cam 114 immediately strikes button 111, swinging arm 100 of bell crank lever 96 to the left and thereby lifting dog 102 out of engagement with washer 95 so that spring 79 becomes immediately operative to disengage elements 72 and 80.

Due to the fact that flange 112 is in driving connection with the rear wheels, it is rotated upon any accidental travelling movement of the truck in either direction. For example, if the truck is on an incline and the brakes become released accidentally, resulting in any movement of the truck, the drive to pump 82 is immediately thrown out. On the other hand, if the transmission were placed in gear flange 112 would be rotated and drive to the master pump immediately thrown out. It will be seen that this latter circumstance is the same in effect as that first mentioned since drive of flange 112 from the truck motor inevitably results in travelling movement of the truck.

A rod 115, pivoted to the lower end of bell crank lever arm 100 extends forwardly to be connected to the usual clutch lever 116 through a pin and slot connection 117. The pin and slot connection permits free action of the bell crank lever without interference from the clutch lever. However, if the clutch lever is actuated when the mechanism is set to engage the master pump drive, rod 115 will be moved to the left to swing arm 100 and thus disengage dog 102 from washer 95 so that the master pump drive is immediately interrupted.

Finally, upon an undue rise in temperature, as in the case of fire, the collapse of the fusible washer 94 will permit movement of rod 77 to the right, block 88 acting to cam nose 101 upwardly so that dog 102 is released from washer 95.

It should be mentioned that in Figure 1, valves 57 and 60 are shown as combined in a single unit which need not be specifically described here since it does not differently affect the operation of the devices to be claimed.

From the above description it will be seen that the safety devices provided in accordance with the present invention take care of situations which in the past have frequently led to serious accidents through continued tank discharge. As mentioned above, I do not necessarily limit myself to the details of construction shown and described since considerable variation is possible without departure from the scope of the invention as defined in the following claims.

I claim:

1. In a tank truck, a discharge conduit for the tank, truck propulsion means including a drive shaft, and means operated when said drive shaft is rotated during discharge to interrupt discharge.

2. In a tank truck comprising truck driving means including a motor and a propeller shaft, the combination of a hydraulic tank discharge system including a master pump, disengageable drive connections between said motor and said pump, and means automatically operated upon rotation of said propeller shaft to disengage said drive connections.

3. In a tank truck comprising truck driving means including a motor, and a clutch lever, the combination of a hydraulic tank discharge system including a master pump, disengageable drive connections between said motor and said pump, and means actuated upon operation of the clutch lever to disengage said drive connections.

4. In a tank truck, a truck driving motor, a hydraulic tank discharge system including a master pump, disengageable drive connections between said motor and said pump, spring means tending to disengage said connections, and cooperating abutment elements maintaining the engagement of said connections against the action of said spring means, one of said abutment elements being fusible at a relatively low temperature so as to release the other.

5. In a tank truck, tank discharge mechanism, an interruptible drive train for said discharge mechanism, means maintaining said drive train operative, means yieldingly acting to interrupt said drive train, and means operated upon travelling movement of the truck to release said first named means whereupon the drive train is interrupted through the action of said second named means.

6. In a tank truck, tank discharge mechanism, an interruptible drive train for said discharge mechanism, means maintaining said drive train operative, means yieldingly acting to interrupt said drive train, and means operated upon travelling movement of the truck in either direction to release said first named means whereupon the drive train is interrupted through the action of said second named means.

7. In a tank truck, tank discharge mechanism, drive means for said discharge mechanism, propulsion means for said truck, and means actuated by a moving element of said propulsion means upon accidental traveling movement of the truck during discharge to render said drive means inoperative.

8. In a tank truck, tank discharge mechanism, drive means for said discharge mechanism including a disengageable driving connection, means for holding said connection in operative disposition, and means operated upon a travelling movement of the truck to render said last named means inoperative whereby disengagement of said connection is permitted.

9. In a tank truck, tank discharge mechanism, drive means for said discharge mechanism including a disengageable driving connection, means for holding said connection in operative disposition, means operated upon a travelling movement of the truck to render said last named means inoperative whereby disengagement of said connection is permitted, and spring means for effecting such disengagement.

10. In a tank truck, discharge mechanism for the tank, drive means for the discharge mechanism including a disengageable drive connection, means including a fusible portion holding said connection engaged, and means effecting disengagement of said connection upon fusion of said fusible portion.

11. In a tank truck, hydraulic discharge mechanism for the tank including a discharge pump, a hydraulic motor for driving said pump, and a pump for supplying fluid under pressure to said motor; a motor for driving said supply pump, and a driving train between said last-named motor and pump, said train including a disengageable driving connection, and means acting automatically upon travelling movement of the truck to disengage said connection whereby to interrupt supply to said hydraulic motor.

12. In a tank truck, hydraulic discharge mechanism for the tank including a discharge pump, a hydraulic motor for driving said pump, and a pump for supplying fluid under pressure to said motor; a motor for driving said supply pump, and a driving train between said last-named motor and pump, said train including a disengageable driving connection, and means acting automatically upon a predetermined rise in temperature to disengage said connection whereby to interrupt supply to said hydraulic motor.

13. In a tank truck, tank discharge mechanism, drive means for said discharge mechanism including a disengageable drive connection, truck propulsion means and control means therefor including a clutch lever, and means actuated upon operation of the clutch lever to disengage said drive connection.

14. In a tank truck, tank discharge mechanism, drive means for said discharge mechanism including a disengageable drive connection, truck propulsion means and control means therefor including a clutch lever, spring means yieldingly acting on said connection to disengage the same, latch means holding said connection engaged against the action of said spring means, and means actuated upon operation of the clutch lever to trip said latch means.

15. In a tank truck, tank discharge mechanism, drive means for said discharge mechanism including a disengageable driving connection, a latch member for holding said connection in operative disposition, spring means acting to disengage said connection, truck propulsion mechanism including a tail shaft, a disc fixed on said shaft, a cam member on said disc, and trip means for said latch member including a movable element positioned to be struck by said cam member upon rotation of said disc.

16. In a tank truck, tank discharge mechanism, drive means for said mechanism including a disengageable driving connection, operating mechanism for said connection including a reciprocable rod, spring means acting to maintain the connection disengaged, an abutment on the rod, a latch adapted to engage the abutment to hold the connection engaged against the action of said spring means, a cam block slidable to a limited extent on said rod, a nose on said latch riding on said cam block, and an operating lever in connection with said block, the latch nose riding down on said block to enable the latch to engage the abutment upon movement of the block and rod to engage said connection and riding upon said block to disengage the latch when the block is moved in the opposite direction relative to the rod.

17. In a tank truck, tank discharge mechanism, drive means for said mechanism including a disengageable driving connection, operating mechanism for said connection including a reciprocable rod, spring means acting to maintain the connection disengaged, an abutment on the rod, a latch adapted to engage the abutment to hold the connection engaged against the action of said spring means, a cam block slidable to a limited extent on said rod, a nose on said latch riding on said cam block, an operating lever in connection with said block, the latch nose riding down on said block to enable the latch to engage the abutment upon movement of the block and rod to engage said connection and riding upon said block to disengage the latch when the block is moved in the opposite direction relative to the rod, an arm projecting from the latch, and means connected to said arm and actuated upon travelling movement of the truck to trip the latch.

18. In a tank truck, tank discharge mechanism, drive means for said mechanism including a disengageable driving connection, operating mechanism for said connection including a reciprocable rod, spring means acting to maintain the connection disengaged, an abutment on the rod, a latch adapted to engage the abutment to hold the connection engaged against the action of said spring means, a cam block slidable to a limited extent on said rod, a nose on said latch riding on said cam block, an operating lever in connection with said block, the latch nose riding down on said block to enable the latch to engage the abutment upon movement of the block and rod to engage said connection and riding upon said block to disengage the latch when the block is moved in the opposite direction relative to the rod, an arm projecting from the latch, truck propulsion means and control means therefor including a clutch lever, and a connection between said lever and said arm whereby the latch is tripped upon actuation of the lever.

19. In a tank truck, tank discharge mechanism, drive means for said mechanism including a disengageable driving connection, operating mechanism for said connection including a reciprocable rod, spring means acting to maintain the connection disengaged, a readily fusible abutment on the rod, a latch adapted to engage the abutment to hold the connection engaged against the action of said spring means, a cam block slidable to a limited extent on said rod, a nose on said latch riding on said cam block, and an operating lever in connection with said block, the latch nose riding down on said block to enable the latch to engage the abutment upon movement of the block and rod to engage said connection and riding upon said block to disengage the latch when the block is moved in the opposite direction relative to the rod.

20. In a tank truck, a discharge conduit for the tank, means rotated as a result of accidental travelling movement of the truck, and means operated by said first means to interrupt discharge through said conduit.

21. In a tank truck, tank discharge mechanism, drive means for said discharge mechanism, means rotated as a result of accidental travelling movement of the truck, and means operated by said last named means to render said drive means inoperative.

22. In a tank truck, propulsion means including an engine, control means for the propulsion means including a clutch and an actuating lever for said clutch, a tank discharge pump, an interruptible drive connection between said engine and said pump, and means operating to interrupt said drive connection when said clutch lever is actuated.

FRANK A. HOLBY.